United States Patent
Song (10) Patent No.: US 10,132,417 B2
(45) Date of Patent: Nov. 20, 2018

(54) SIX-WAY DIRECTIONAL VALVE (71) Applicants: GD MIDEA HEATING & VENTILATING EQUIPMENT CO., LTD., Foshan (CN); MIDEA GROUP CO., LTD., Foshan (CN)

(72) Inventor: Rui Song, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/325,794

(22) PCT Filed: Jun. 24, 2015

(86) PCT No.: PCT/CN2015/082247
§ 371 (c)(1),
(2) Date: Jan. 12, 2017

(87) PCT Pub. No.: WO2016/192148
PCT Pub. Date: Dec. 8, 2016

(65) Prior Publication Data
US 2017/0138488 A1 May 18, 2017

(30) Foreign Application Priority Data

Jun. 1, 2015 (CN) .......................... 2015 1 0292204
Jun. 1, 2015 (CN) ...................... 2015 2 0367442 U (51) Int. Cl.
*F16K 11/07* (2006.01)
*F16K 31/122* (2006.01)
(Continued)

(52) U.S. Cl.
CPC ............ *F16K 11/07* (2013.01); *F16K 31/122* (2013.01); *F16K 31/124* (2013.01);
(Continued)

(58) Field of Classification Search
CPC ............ F16K 11/07; Y10T 137/86606; Y10T 137/86582; Y10T 137/86678; Y10T 137/86686; Y10T 137/8671
(Continued)

(56) References Cited

FOREIGN PATENT DOCUMENTS

| CN | 101776162 A | 7/2010 |
|----|-------------|--------|
| CN | 201983529 U | 9/2011 |

(Continued)

OTHER PUBLICATIONS

PCT/CN2015/082247, English translation of International Search Report dated Feb. 22, 2016, with brief translation, 8 pages.

(Continued)

*Primary Examiner* — Kevin Murphy
*Assistant Examiner* — Kelsey Cary
(74) *Attorney, Agent, or Firm* — Lathrop Gage LLP (57) ABSTRACT

A six-way directional valve (100) is provided, including: a valve body (1), defining a valve cavity (4) therein, and provided with a first connecting pipe to a sixth connecting pipe (11-16); a valve spool (2), movably disposed in the valve cavity (4), two valve chambers (3) being defined between two moving ends of the valve spool (2) and an inner circumferential wall of the valve cavity (4), so that the valve spool (2) being allowed to be driven to move by a pressure difference between the two valve chambers (3), a first chamber (21) and a second chamber (22) being defined between the valve spool (2) and a same side wall of the valve cavity (4), a third chamber (23) being defined between the valve spool (2) and the inner circumferential wall of the valve cavity (4); and a pilot valve assembly (5).

4 Claims, 5 Drawing Sheets

(51) Int. Cl.
*F16K 31/124* (2006.01)
*F25B 41/04* (2006.01)
*F25B 13/00* (2006.01)

(52) U.S. Cl.
CPC ............ *F25B 41/046* (2013.01); *F25B 13/00* (2013.01); *F25B 2313/0276* (2013.01)

(58) Field of Classification Search
USPC .............. 137/625.63, 625.6, 625.26, 625.27, 137/625.69
See application file for complete search history.

(56) References Cited

FOREIGN PATENT DOCUMENTS

| | | | |
|---|---|---|---|
| CN | 102588627 | A | 7/2012 |
| CN | 102853114 | A | 1/2013 |
| CN | 203374885 | U | 1/2014 |
| CN | 104896612 | A | 9/2015 |
| EP | 0685693 | A2 | 12/1995 |
| JP | H08170865 | A | 7/1996 |
| JP | H11201304 | A | 7/1999 |
| JP | 2000046213 | A | 2/2000 |
| JP | 2008286452 | A | 11/2008 |

OTHER PUBLICATIONS

Chinese patent application No. 201510292204.1, first office action dated Oct. 19, 2016 with English translation, 9 pages.
European Patent Application No. 15893804.3 extended Search and Opinion dated Apr. 12, 2018, 7 pages.

SIX-WAY DIRECTIONAL VALVE

CROSS-REFERENCE TO RELATED APPLICATIONS

This U.S. application claims priority under 35 U.S.C. 371 to, and is a U.S. National Phase application of, the International Patent Application No. PCT/CN2015/082247, filed Jun. 24, 2015, which claims the benefit of prior Chinese Application No. 201510292204.1, filed Jun. 1, 2015 and Chinese Application No. 201520367442.X filed Jun. 1, 2015. The entire contents of the above-mentioned patent applications are incorporated by reference as part of the disclosure of this U.S. application.

FIELD

The present disclosure relates to a technical field of refrigeration equipment, and more particularly to a six-way directional valve.

BACKGROUND

In related technologies, two four-way directional valves are usually connected in series in an air conditioner to achieve directional circulation of the refrigerant in the air conditioner. However, installing the two four-way directional valves in series increases the cost of the directional valve.

SUMMARY

Embodiments of the present disclosure seek to solve at least one of the problems existing in the related art to at least some extent. For that reason, the present disclosure provides a six-way directional valve, which may reduce the cost of the directional valve to some extent.

The six-way directional valve according to the present disclosure includes a valve body, the valve body defining a valve cavity therein, the valve body being provided with a first connecting pipe, a second connecting pipe, a third second connecting pipe, a fourth connecting pipe, a fifth connecting pipe and a sixth connecting pipe; a valve spool, movably disposed in the valve cavity, in which, two valve chambers are defined between two moving ends of the valve spool and an inner circumferential wall of the valve cavity, so that the valve spool is allowed to be driven to move by a pressure difference between the two valve chambers, a first chamber and a second chamber are defined between the valve spool and a same side wall of the valve cavity, a third chamber is defined between the valve spool and an inner circumferential wall of the valve cavity, the first connecting pipe is normally communicated with the third chamber, the third connecting pipe is normally communicated with the first chamber, the fifth connecting pipe is normally communicated with the second chamber, the valve spool moves so that one of the second connecting pipe and the sixth connecting pipe is communicated with the third chamber, the first chamber is communicated with the second connecting pipe or the fourth connecting pipe, and the second chamber is communicated with the fourth connecting pipe or the sixth connecting pipe; and a pilot valve assembly, connected to the two valve chambers so as to switch pressures in the two valve chambers.

The six-way directional valve according to the present disclosure, by disposing the first connecting pipe to the sixth connecting pipe on the six-way directional valve, and disposing the valve spool movably in the valve cavity to achieve the directional control function of the six-way directional valve, avoids using a plurality of four-way valves in the air-conditioning outdoor unit to achieve the same effect with the six-way directional valve, reducing the cost of the directional valve to some extent and simplifying the connection of the pipes in the air-conditioning outdoor unit.

According to some embodiments of the present disclosure, the valve spool includes: two barrier blocks spaced apart from each other, the two valve chambers being defined between the two barrier blocks and the inner circumferential wall of the valve cavity; and a sliding block, disposed between the two barrier blocks and connected to the two barrier blocks through a connecting rod, the first chamber and the second chamber being defined between the sliding block and the same side wall of the valve cavity, and the third chamber being defined between the sliding block, two connecting rods, two barrier blocks and the inner circumferential wall of the valve cavity.

Further, the two barrier blocks, the sliding block and the two connecting rods are an integrally formed member.

According to some embodiments of the present disclosure, the first connecting pipe is disposed to a first side wall of the valve body, and the second connecting pipe to the sixth connecting pipe are disposed to a second side wall of the valve body opposite to the first side wall and are arranged successively.

According to some embodiments of the present disclosure, the valve body has a circular cross section.

REFERENCE NUMERALS outdoor unit of air conditioner 1000;
six-way directional valve 100; valve body 1; first connecting pipe 11; second connecting pipe 12; third connecting pipe 13; fourth connecting pipe 14; fifth connecting pipe 15; sixth connecting pipe 16; valve spool 2; first chamber 21; second chamber 22; third chamber 23; barrier block 24; sliding block 25; connecting rod 26; valve chamber 3; valve cavity 4; pilot valve assembly 5;
outdoor unit output port 200;
outdoor unit input port 300;
compressor 400; air exhaust port 401; air return port 402;
outdoor heat exchanger 500;
L left; R right.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

In the specification, unless specified or limited otherwise, relative terms such as "transverse", "left", "right", should be construed to refer to the orientation as then described or as shown in the drawings under discussion. These relative terms are for convenience of description and do not require that the present disclosure be constructed or operated in a particular orientation.

In the description of the present disclosure, unless specified or limited otherwise, the terms "mounted," "connected," and "coupled" and variations thereof should be used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

A six-way directional valve 100 according to embodiments of the present disclosure will be described in the following with reference to drawings, which may be applied to an air conditioner, and used for switching a following direction of a refrigerant in the air conditioner.

As shown in FIGS. 1-5, the six-way directional valve 100 according to the embodiments of the present disclosure may include a valve body 1, a valve spool 2 and a pilot valve assembly 5.

Specifically, the valve body 1 defines a valve cavity 4 therein, the valve body 1 is provided with a first connecting pipe 11, a second connecting pipe, a third second connecting pipe, a fourth connecting pipe, a fifth connecting pipe and a sixth connecting pipe 16, the first connecting pipe 11 to the sixth connecting pipe 16 are communicated with other pipes in the air conditioner respectively, so as to facilitate the circulation of the refrigerant.

Figure 3:
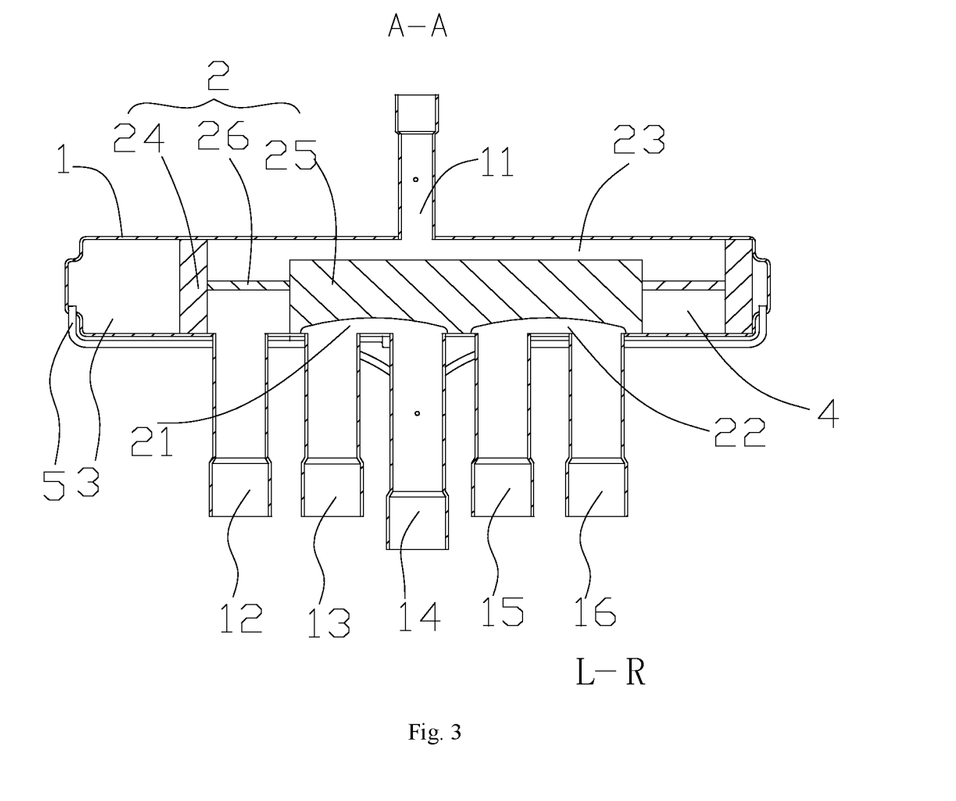
FIG. 3 is a sectional view of the six-way directional valve taken along line A-A shown in FIG. 2.

The valve spool 2 is movably disposed in the valve cavity 4, that is, the valve spool 2 is movable in the valve cavity 4, thus, by moving the valve spool 2 in the valve cavity 4, a directional control function of the six-way directional valve 100 may be achieved, thus achieving the directional circulation of the refrigerant in the air conditioner.

Two valve chambers 3 are defined between two moving ends of the valve spool 2 and inner circumferential walls of the valve cavity 4, so that the valve spool 2 is allowed to be driven to move by a pressure difference between the two valve chambers 3, that is, the movement action of the valve spool 2 in the valve cavity 4 is driven by the pressure difference of the two valve chambers 3. Specifically, when the pressure in one valve chamber 3 of the two valve chambers 3 is relatively higher, the valve spool 2 is allowed to move towards the other one valve chamber 3 which has a relatively lower pressure therein, eventually a pressure balance is reached, thus moving the valve spool 2 by this manner, thereby achieving the directional control function of the six-way directional valve 100.

Specifically, the pilot valve assembly 5 is connected to the two valve chambers 3, so as to switch the pressures in the two valve chambers 3. Additionally, the pilot valve assembly 5 is connected with the first connecting pipe 11 through a pipe 17, and the pilot valve assembly 5 is connected with the fourth connecting pipe 14 through a pipe 18. For example, when the air conditioner needs to be switched between a refrigeration mode and a heating mode, the pilot valve assembly 5 switches the pressure in the two valve chambers 3, so that the valve spool 2 is allowed to move towards the valve chamber 3 having a lower pressure, thus achieving the directional control of the six-way directional valve 100 and changing the circulation direction of the refrigerant by this way, thereby achieving the refrigeration function or heating function of the air conditioner.

Figure 4:
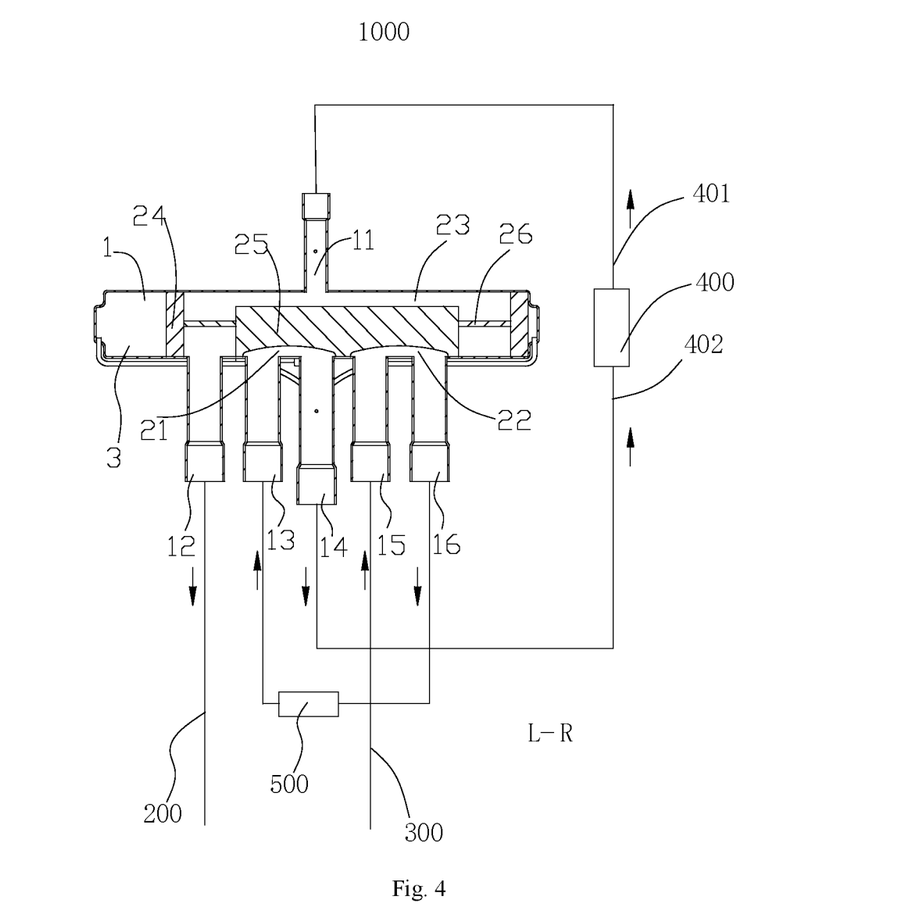
FIG. 4 is a schematic view of a connection between the six-way directional valve according to embodiments of the present disclosure and pipes.
Figure 5:
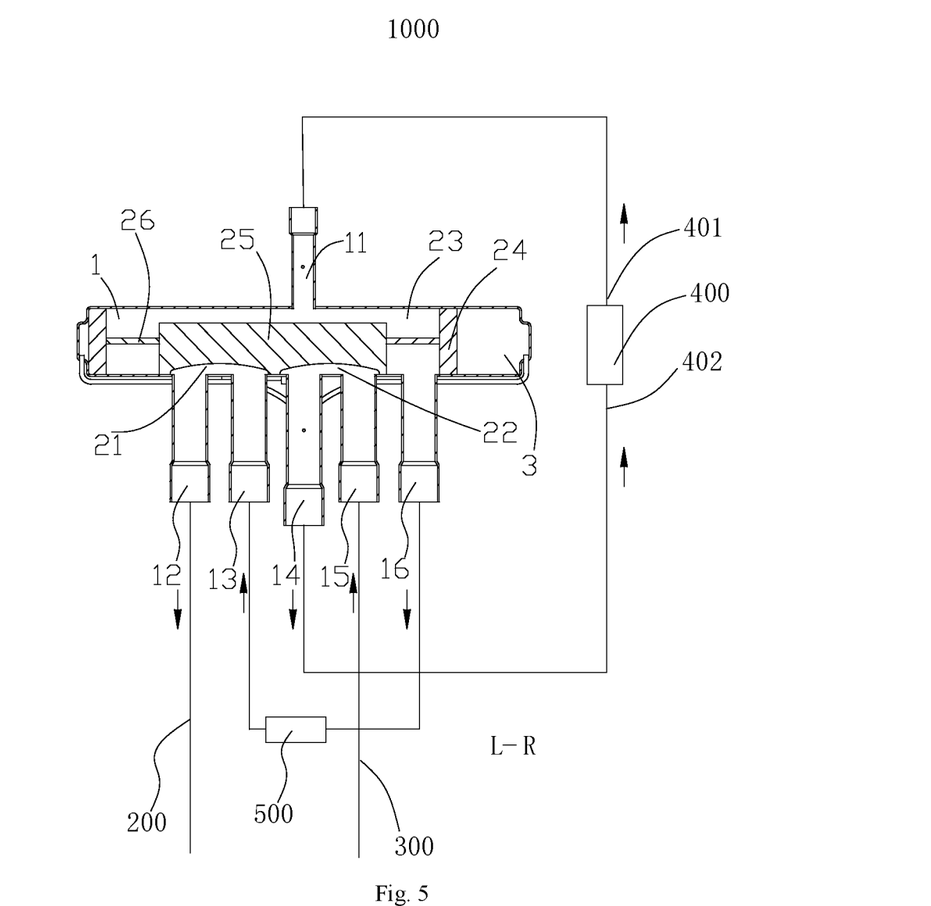
FIG. 5 is a schematic view of a connection between the six-way directional valve after directional control shown in FIG. 4 and the pipes.

As shown in FIGS. 3-5, a first chamber 21 and a second chamber 22 are defined between the valve spool 2 and a same side wall of the valve cavity 4, and a third chamber 23 is defined between the valve spool 2 and an inner circumferential wall of the valve cavity 4. The first connecting pipe 11 is normally communicated with the third chamber 23, the third connecting pipe 13 is normally communicated with the first chamber 21, and the fifth connecting pipe 15 is normally communicated with the second chamber 22. That is, no matter whether a direction of the six-way directional valve 100 is controlled or not, the first connecting pipe 11 is always communicated with the third chamber 23, the third connecting pipe 13 is always communicated with the first chamber 21, and the fifth connecting pipe 15 is always communicated with the second chamber 22.

The valve spool 2 moves so that one of the second connecting pipe 12 and the sixth connecting pipe 16 is communicated with the third chamber 23, the first chamber 21 is communicated with the second connecting pipe 12 or the fourth connecting pipe 14, the second chamber 22 is communicated with the fourth connecting pipe 14 or the sixth connecting pipe 16. That is, when the second connecting pipe 12 is communicated with the third chamber 23, the first chamber 21 is communicated with the fourth connecting pipe 14, and the second chamber 22 is communicated with the sixth connecting pipe 16. When the sixth connecting pipe 16 is communicated with the third chamber 23, the second connecting pipe 12 is communicated with the first chamber 21, and the fourth connecting pipe 14 is communicated with the second chamber 22.

Specifically, the pilot valve assembly 5 switches the pressure in the two valve chambers 3, so that the valve spool 2 is allowed to move towards the valve chamber 3 having the lower pressure. For example, when the valve spool 2 moves to right, as shown in FIGS. 3 and 4, at this moment, the first connecting pipe 11 and the second connecting pipe 12 are communicated with the third chamber 23, the third connecting pipe 13 and the fourth connecting pipe 14 are communicated with the first chamber 21, and the fifth connecting pipe 15 and the sixth connecting pipe 16 are communicated with the second chamber 22. When the valve spool 2 moves to left, as shown in FIG. 5, the first connecting pipe 11 and the sixth connecting pipe 16 are communicated with the third chamber 23, the second connecting pipe 12 and the third connecting pipe 13 are communicated with the first chamber 21, the fourth connecting pipe 14 and the fifth connecting pipe 15 are communicated with the second chamber 22. It should be understood that, the left and right movements of the valve spool 2 are just explanatory descriptions according to FIG. 3-FIG. 5, and shall not be construed as a limit to the valve spool 2. In order to facilitate the description, the movements of the valve spool 2 mentioned in below are all explanatively described by the left or right movement.

It should be noted that, for facilitating clearly describing the directional principle of the six-way directional valve 100, the six-way directional valve 100 will be described in the following accompanying an air conditioner. The air conditioner includes an outdoor unit 1000 for the air conditioner and an indoor unit for the air conditioner. In which, the outdoor unit 1000 has an outdoor unit output port 200 and an outdoor unit input port 300. The outdoor unit 1000 includes a compressor 400, the above-mentioned six-way directional valve 100 and an outdoor heat exchanger 500. In which, the first connecting pipe 11 is communicated with an air exhaust port 401 of the compressor 400, the second connecting pipe 12 is communicated with the outdoor unit output port 200, the fourth connecting pipe 14 is communicated with an air return port 402 of the compressor 400, the fifth connecting pipe 15 is communicated with the outdoor unit input port 300, and both ends of the outdoor heat exchanger 500 are respectively communicated with the third connecting pipe 13 and the sixth connecting pipe 16.

As shown in FIG. 3 and FIG. 4, when the air conditioner is in the heating mode, the pilot valve assembly 5 switches the pressures in the two valve chambers 3, so that the valve spool 2 moves to right, at the moment the first connecting pipe 11 and the second connecting pipe 12 are communicated with the third chamber 23, the third connecting pipe 13 and the fourth connecting pipe 14 are communicated with the first chamber 21, and the fifth connecting pipe 15 and the sixth connecting pipe 16 are communicated with the second chamber 22. The refrigerant with a high pressure and a high temperature exhausted from the exhaust port 401 of the compressor 400 enters the third chamber 23 through the first connecting pipe 11, then flowing out from the second connecting pipe 12, entering the indoor unit for the air conditioner through the outdoor unit output port 200, and exchanging heat with the indoor environment in the indoor unit for the air conditioner to improve the indoor temperature. Then the refrigerant exhausted from the indoor unit for the air conditioner enters the second chamber 22 through the outdoor unit input port 300 and the fifth connecting pipe 15, subsequently enters the outdoor heat exchanger 500 through the sixth connecting pipe 16, and exchanges heat with the outdoor environment in the outdoor heat exchanger 500. And then the refrigerant enters the first chamber 21 through the third connecting pipe 13 after flowing out from the outdoor heat exchanger 500, and returns to the compressor 400 through the fourth connecting pipe 14 and the air return port 402 of the compressor 400. The refrigerant circulates like this to form the heating circulation.

As shown in FIG. 5, when the air conditioner is in the refrigeration mode, the pilot valve assembly 5 switches the pressures in the two valve chambers 3, so that the valve spool 2 moves to the left, at the moment the first connecting pipe 11 and the sixth connecting pipe 16 are communicated with the third chamber 23, the second connecting pipe 12 and the third connecting pipe 13 are communicated with the first chamber 21, and the fourth connecting pipe 14 and the fifth connecting pipe 15 are communicated with the second chamber 22. The refrigerant with a high pressure and high temperature exhausted from the exhaust port 401 of the compressor 400 enters the third chamber 23 through the first connecting pipe 11, then flows out from the sixth connecting pipe 16, enters the outdoor heat exchanger 500, and exchanges heat with the outdoor environment in the outdoor heat exchanger 500. Then after flowing out from the outdoor heat exchanger 500, the refrigerant enters the first chamber 21 through the third connecting pipe 13, subsequently flows out from the second connecting pipe 12, and enters the indoor unit for the air conditioner through the outdoor unit output port 200. After flowing out from the indoor unit for the air conditioner, the refrigerant enters into the second chamber 22 through the outdoor unit input port 300 and the fifth connecting pipe 15, then flows out from the fourth connecting pipe 14, and returns to the compressor 400 through the air return port 402 of the compressor 400. The refrigerant circulates like this to form the refrigeration circulation.

The first connecting pipe 11 to the sixth connecting pipe 16 are disposed to the six-way directional valve 100 according to the embodiments of the present disclosure, and the valve spool 2 is disposed movably in the valve cavity 4 to achieve the directional control function of the six-way directional valve 100, thus facilitating the directional circulation of the refrigerant in the pipes where the six-way directional valve 100 is, and avoiding using a plurality of four-way valves (to achieve the same effect as the six-way directional valve 100) in the pipes, which reduces the cost of the directional valve to some extent and simplifies the connection of the pipes in the air conditioner.

According to some embodiments of the present disclosure, the valve spool 2 includes two barrier blocks 24 spaced apart from each other and a sliding block 25. In which, valve chambers 3 are defined between the two barrier blocks 24 spaced apart and the inner circumferential wall of the valve cavity 4, thereby facilitating the valve spool 2 moving in the valve cavity 4 to achieve the directional control of the six-way directional valve 100.

The sliding block 25 is disposed between the two barrier blocks 24, the sliding block 25 is connected to the two barrier blocks 24 through a connecting rod 26, the first chamber 21 and the second chamber 22 are defined between the sliding block 25 and the same side wall of the valve cavity 4, and the third chamber 23 is defined between the sliding block 25, two connecting rods 26, the two barrier blocks 24 and the inner circumferential wall of the valve cavity 4. Specifically, after that the pilot valve assembly 5 switches the pressures in the two valve chambers 3, a pressure in the valve chamber 3 having a higher pressure drives the barrier blocks 24, and the barrier blocks 24 drive the sliding block 25 to move towards the valve chamber 3 having a lower pressure, so as to achieve connections between the first chamber 21, the second chamber 22 and the third chamber 23 and the corresponding first connecting pipe 11 to the sixth connecting pipe 16 respectively, thereby achieving the directional control of the six-way directional valve 100.

Optionally, the two barrier blocks 24, the sliding block 25 and the two connecting rods 26 are configured as an integrally formed member, thus not only facilitating the production, processing and manufacturing of the barrier blocks 24, the sliding block 25 and the two connecting rods 26, but also saving the production cost of the valve spool 2, in the meanwhile improving the strength of the connection among the barrier blocks 24, the sliding block 25 and the two connecting rods 26 to some extent, and prolonging the service life of the valve 2.

According to some embodiments of the present disclosure, as shown in FIG. 1 and FIGS. 3-5, the first connecting pipe 11 is disposed to a first side wall of the valve body 1, the second connecting pipe 12 to the sixth connecting pipe 16 are respectively disposed to a second side wall of the valve body 1 opposite to the first side wall and are arranged successively, that is, the first connecting pipe 11 are disposed oppositely to the second connecting pipe to the sixth connecting pipe 12-16, thereby facilitating connections between the first connecting pipe 11 to the sixth connecting pipe 16 and the corresponding first chamber 21 to the third chamber 23 respectively, so as to achieve the directional control of the six-way directional valve 100.

Figure 1:
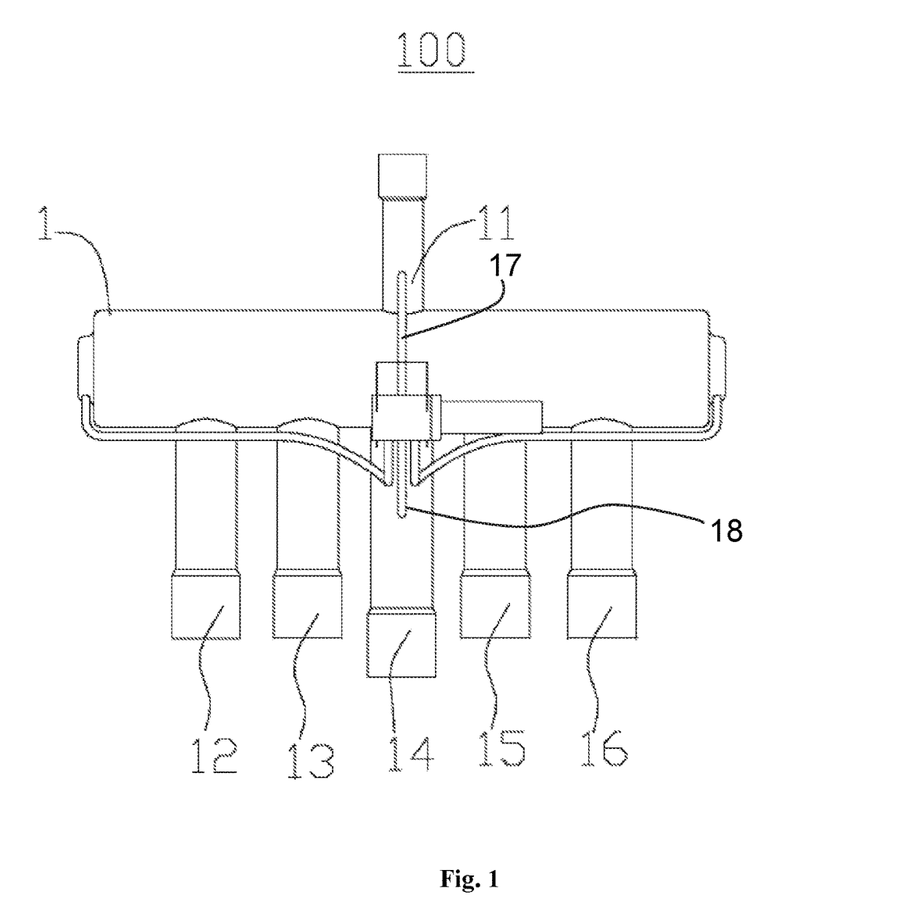
FIG. 1 is a front view of a six-way directional valve according to embodiments of the present disclosure.
Figure 2:
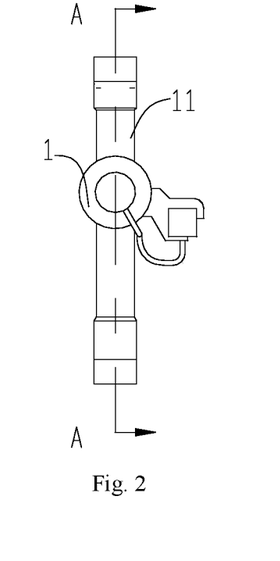
FIG. 2 is a left view of a six-way directional valve according to embodiments of the present disclosure.

Optionally, the valve body 1 may have a circular cross section, as shown in FIG. 2, thereby facilitating the communication between the six-way directional valve 100 and other pipes in an air conditioner.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A six-way directional valve comprising:
   a valve body, defining a valve cavity therein and provided with a first connecting pipe, a second connecting pipe, a third connecting pipe, a fourth connecting pipe, a fifth connecting pipe and a sixth connecting pipe;
   a valve spool, movably disposed in the valve cavity, wherein two valve chambers are defined between two moving ends of the valve spool and an inner circumferential wall of the valve cavity, so that the valve spool is driven to move by a pressure difference between the two valve chambers, a first chamber and a second chamber are defined between the valve spool and a same side wall of the valve cavity, a third chamber is defined between the valve spool and the inner circumferential wall of the valve cavity, the first connecting pipe is normally communicated with the third chamber, the third connecting pipe is normally communicated with the first chamber, the fifth connecting pipe is normally communicated with the second chamber, the valve spool moves so that one of the second connecting pipe and the sixth connecting pipe is communicated with the third chamber, the first chamber is communicated with the second connecting pipe or the fourth connecting pipe, and the second chamber is communicated with the fourth connecting pipe or the sixth connecting pipe; and
   a pilot valve assembly, connected with the two valve chambers so as to switch pressures in the two valve chambers, and connected with the first connecting pipe and the fourth connecting pipe,
   wherein the valve spool comprises:
   two barrier blocks spaced apart from each other, the two valve chambers being defined between the two barrier blocks and the inner circumferential wall of the valve cavity; and
   a sliding block, disposed between the two barrier blocks and connected to the two barrier blocks through two connecting rods, the sliding block being slidable with respect to the same side wall of the valve cavity, the first chamber and the second chamber being defined between the sliding block and the same side wall of the valve cavity, and the third chamber being defined between the sliding block, the two connecting rods, the two barrier blocks and the inner circumferential wall of the valve cavity,
   the two barrier blocks, the sliding block and the two connecting rods are configured as an integrally formed member.

2. The six-way directional valve according to claim 1, wherein the first connecting pipe is disposed to a first side wall of the valve body, and the second connecting pipe to the sixth connecting pipe are disposed to a second side wall of the valve body opposite to the first side wall and are arranged successively.

3. The six-way directional valve according to claim 1, wherein the valve body has a circular cross section.

4. The six-way directional valve according to claim 2, wherein the valve body has a circular cross section.

* * * * *